United States Patent Office 3,748,124
Patented July 24, 1973

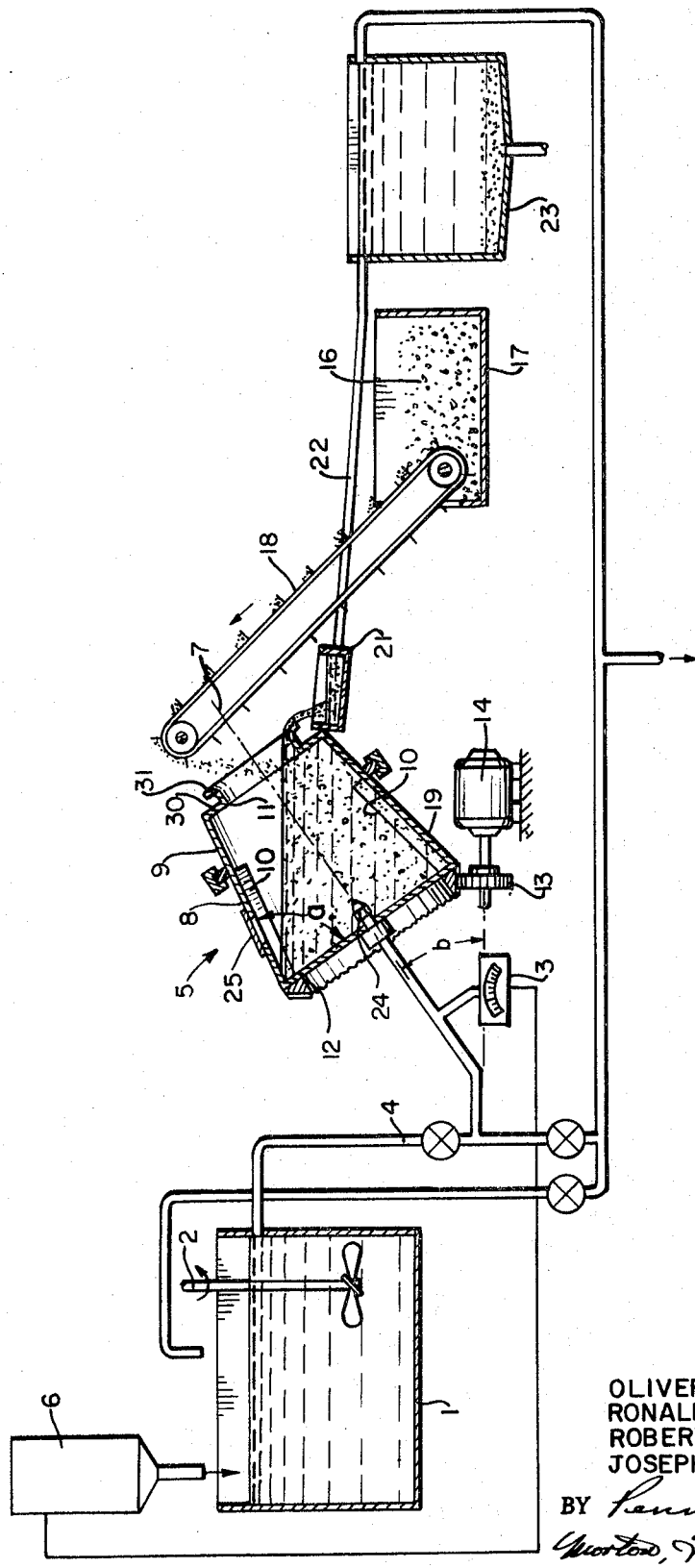

3,748,124
METHOD FOR SIMULTANEOUS REDUCTION OF HEXAVALENT CHROMIUM AND CEMENTATION OF COPPER
Oliver P. Case, Naugatuck, Ronald B. L. Jones, Watertown, Robert D. Spellman, Bethlehem, and Joseph W. Archambault, Waterbury, Conn., assignors to Anaconda American Brass Company
Filed Jan. 11, 1971, Ser. No. 105,380
Int. Cl. C22b 25/04
U.S. Cl. 75—109      7 Claims

ABSTRACT OF THE DISCLOSURE

A method and apparatus for simultaneously reducing hexavalent chromium and achieving the cementation of copper from a solution containing soluble copper compounds and hexavalent chromium compounds, including adding sulfuric acid to the solution in sufficient quantities to maintain a pH in the range of about 1.5 to about 3.0 and introducing the solution into a rotatable inclined chamber having iron-containnig objects therein to accomplish both the reduction of the hexavalent chromium and the cementation of a substantial portion of the copper. Cemented copper is separated from the treated solution and the solution may then be reprocessed for further copper removal.

BACKGROUND OF THE INVENTION

The long-standing problem of water pollution is today, in this age of greater industrial activity, an increased threat to our environment. Many of today's waterways and water tables are becoming polluted due to the waste discharge from various manufacturing processes. In particular, chromium and copper are known to be significant pollutants to our waterways when present in certain concentrations. These metals are found in considerable quantities in pickle liquors, plating baths and other effluents resulting from the manufacture and processing of coper-containing metals. The problem of discharge of these elements is now being considered by governmental agencies which are moving toward restriction which will require that the treated effluents now being discharged from these manufacturing operations contain significantly less chromium and copper.

Although prior techniques utilizing contact with iron-containing objects for treating such effluents have been developed to either reduce hexavalent chromium or to cement copper, none of these methods accomplished both operations simultaneously in a substantially continuous, efficient and complete manner. For example. Nadkarni's article entitled "A Kinetic Study of Copper Precipitation on Iron—Part 1" in Transactions of Metallurgical Society of AIME, vol. 239, No. 4, p. 581 (April 1967) discusses the theory of copper cementation by iron and U.S. Pat. No. 3,288,599 to Keys, discloses a method for cementation of copper by iron. Further, Hoover and Masselli published a paper in Industrial and Engineering Chemistry, vol. 33, No. 1, pp. 131 (January 1941) entitled "Disposal of Waste Liquors from Chromium Plating" in which a process for the reduction of hexavalent chromium by contact with metallic iron is described. Another process for accomplishing the reduction of hexavalent chromium is described by Brown and Sceiber in the May-June 1969 issue of "The Betz Indicator," prepared by Betz Labs. Inc., Trevose, Pa.

A research reported dated Sept. 10, 1969 of the Anaconda American Brass Company at Waterbury, Conn., includes the suggestion that the reduction of hexavalent chromium and cementation of copper could be simultaneously accomplished in the same chamber but none of the techniques previously described accomplishes the cementation of copper and the reduction of hexavalent chromium in a rotatable inclined chamber to accomplish the advantages obtained by the present invention.

SUMMARY OF THE INVENTION

The present method for the reduction of hexavalent chromium to its trivalent form and for cementing (precipitating) the copper found in a solution includes mixing the solution with the sufficient quantities of sulfuric acid to form a mixture having a pH of about 1.5 to about 3.0, introducing such mixture into a rotatable inclined chamber of selected size containing numerous iron-containing objects therein, which objects supply iron to react with the mixture, and rotating the chamber to cause relative motion between the objects and mixture to insure intimate contact, thereby simultaneously reducing the hexavalent chromium to the trivalent state and cementing the copper out of the mixture, and thereafter separating said solution and the cemented copper. The process may be operated on either a batch or continuous basis. The advantages of the rotatable inclined chamber are its compactness, adaptability to continuous operation and the case of removal of the cemented copper.

It is a feature of the invention that essentially all the chromium is reduced and a substantial portion of the copper cemented during practice of the method. For further removal of copper, the mixture may be again treated by recycling it through the same equipment or a separate arrangement of similar equipment.

To increase the liquid capacity in the inclined chamber, the chamber may have sloping sides and an annular flange around its upper end. The chamber is preferably fitted with deflectors located on the inside surface to carry the iron-containing objects for a portion of a revolution of the chamber before they slide off the deflectors and tumble downwardly. The deflectors assist in maintaining the charge of iron-containing objects in motion and in reducing channeling of the liquid through the charge of iron-containing objects. The geometrical configuration of the objects and the rate of tumbling should be adjusted to promote efficient independent movement between individual objects and the mixture. The deflectors also assist in creating additional relative motion for dislodging the cemented copper and removing passivating films from the surfaces of the objects.

The present method is particularly suitable for treating waste pickle liquors, plating baths and acid rinse waters resulting from the manufacture and processing of brass and other copper-containing metals, but it may also be used for any industrial processes which result in waste material containing hexavalent chromium and soluble copper compounds.

BRIEF DESCRIPTION OF THE DRAWING

The drawing illustrates diagrammatically a preferred embodiment of the method and apparatus of the invention.

DESCRIPTION OF THE PREFERRED EMBODIMENT

Referring to the drawing, tank 1 receives, stores and serves as a container for the mixing of the incoming solutions, and the addition of sulfuric acid if necessary for pH control. A typical waste solution from a brass mill has approximately the following significant constituents:

| | P.p.m. |
|---|---|
| Copper | 100 |
| Zinc | 25 |
| Chromium$^{+6}$ | 25 |
| Chromium$^{+3}$ | 75 |
| Nickel | 2 |
| Sulfuric acid | 500 |

Waste solutions containing other proportions of copper, chromium and other constituents may also be treated using the present invention.

Referring again to the drawing, the waste solution is placed in tank 1 where oil and other floatable contaminants are from time to time skimmed off the surface of the solution and sulfuric acid is added if necessary from tank 6. The acidity of the mixture is controlled by a suitable control arrangement in response to a signal from pH meter 3 which monitors the acidity of the solution in feed conduit 4 prior to its introduction into the precipitation chamber 5. When the pH meter indicates that the pH is moving upward toward 3.0 or another suitably selected limit for control purposes, a required quantity of acid is added to tank 1 from sulfuric acid tank 6 to increase the acidity of the mixture. The acidity of the mixture entering chamber 5 is thus maintained in a preferred range. Rotatable stirrer 2 or other means of agitation provides for thorough mixing of the acid with the waste solution.

Chamber 5, which is preferably made of stainless steel, is mounted for rotation about an axis 7 which forms with the horizontal an angle $b$ of about 35°. Chamber 5 is generally cylindrically shaped with its walls 8 sloping inwardly as they move from the lower portion 19 of the chamber toward the upper portion 9. Angle $a$ between bottom 12 of chamber 5 and the sloping sides is shown to be about 80°. Angle $a$ is preferably between 60 and 90°. Deflector blades 10, spaced around the chamber interior, assist in creating the tumbling action. Circular upper outlet, or mouth, 11 is smaller in diameter than the upper chamber diameter due to annular flange 30. Flange 30 increases the chamber volume available for the reaction without increasing the over-all dimensions of the chamber. Lip 31 which extends from the inner circumference of flange 30 assists in guiding the overflow stream into collecting trough 21. Access hatch 25 provides an entrance to chamber 5 for maintenance of the chamber interior.

Variable speed chamber drive means, which includes gearing 13 and motor 14, causes chamber or drum 5 to rotate about its inclined axis 7. Chamber 5 of the illustrated embodiment is about twenty-eight (28) inches deep and has an inside diameter of about thirty (30) inches at its bottom 12 and an inside diameter of about twenty (20) inches at its mouth 11. It will be understood by those skilled in the art that these dimensions may be modified to suit the volume and character of the solution to be treated. The iron-containing objects placed in the chamber consist of pieces of mild steel scrap about 0.025" thick with the majority of the pieces having a maximum dimension of about 2 inches. The chamber is preferably loaded with iron-containing objects of a size and configuration to provide the maximum exposed surface area as the chamber is rotated; however, a smaller volume bed of objects can be used if the surface area of the iron-containing material and mixture flow rates up through the bed are properly related.

A number of experimental runs employing the inclined drum are described in Table I. The solution treated had the following approximate composition:

| | P.p.m. |
|---|---|
| Copper | 100 |
| Chromium$^{+6}$ | 35 |
| Sulfuric acid to provide a pH range of 1.5–3.0. | |

TABLE I.—CONTINUOUS OPERATION
[Approximately 300 sq. ft. scrap surface]

| Run | 1 | 2 | 3 | 4 | 5 | 6 | 7 | 8 |
|---|---|---|---|---|---|---|---|---|
| pH | 1.6 | 3.0 | 2.3 | 2.3 | 2.1 | 2.1 | 2.1 | 2.1 |
| Ratio of flow in g.p.m. to 100 sq. ft. of scrap surface | 1 | 1 | 0.33 | 3 | 1 | 1 | 1 | 1 |
| Degrees inclination of drum from horizontal | 30 | 30 | 30 | 30 | 25 | 35 | 30 | 30 |
| Drum speed in r.p.m. | 4 | 4 | 4 | 4 | 4 | 4 | 2.4 | 10 |
| Percent Cu removed | 53 | 60 | 84 | 30 | 31 | 11 | 20 | 44 |
| Percent Cr$^{+6}$ reduced | 99.99+ | 99.99+ | 99.99+ | 99.99+ | 99.99+ | 99.99+ | 99.99+ | 99.99+ |

In using a chamber of the general size and configuration as herein described for continuous operation, it was found that a mixture flow rate of about 0.25 to about 3 gallons per minute for each 100 square foot surface area of the iron-containing objects gave satisfactory results. While SAE 1010 steel was used, other mild steel or similar iron-containing material may be used. In making the runs of Table I, the feed mixture was introduced under pressure into chamber 5 through spray or distribution nozzles 24 which are connected to a portion of conduit 4 which passes through a centered opening in the bottom 12 of the chamber, which opening is suitably sealed with an acid-resistant seal to prevent leakage.

Further runs were made in which the drum was filled prior to being rotated and in which no further introduction of solution or scrap was made during the period of rotation. During these batch runs which are set forth in Table II, the drum did not overflow during its operation and the ratio of gallons per minute to scrap surface area was therefore zero.

TABLE II.—BATCH OPERATION (FLOW RATE=0)
[Approximately 300 sq. ft. scrap surface]

| Run | 1 | 2 | 3 | 4 | 5 | 6 |
|---|---|---|---|---|---|---|
| pH | 1.7 | 1.7 | 1.7 | 1.6 | 2.0 | 2.1 |
| Time solution was in drum (min.) | 3 | 5 | 10 | 10 | 10 | 10 |
| Degrees inclination of drum from horizontal | 35 | 35 | 35 | 33 | 30 | 33 |
| Drum speed in r.p.m. | 4 | 4 | 4 | 4 | 4 | 4 |
| Percent Cu removed | 67 | 79 | 85 | 84 | 89 | 80 |
| Percent Cr$^{+6}$ reduced | 99.99+ | 99.99+ | 99.99+ | 99.99+ | 99.99+ | 99.99+ |

In the batching operation, the treated solution is drained out of the drum into settling tank 23 through conduits (not shown) and any precipitated copper in the drum bottom may be removed by flushing it into the settling tank 23 or other suitable container.

All runs accomplished essentially a complete reduction of the chromium and produced a satisfactory degree of cementation of copper. The preferred ranges of the present method, using an inclined drum in continuous or batching operation, are: a pH of the mixture in the drum of about 1.5 to about 3.0; a ratio of 0 to 4.0 gallons per minute flow through the drum for each 100 square feet of scrap steel surface area; a drum inclination of about 25° to about 35°; and a drum rotation of about 2 r.p.m. to 10 r.p.m.

Chamber angle $b$ may be as low as 20° and as high as 45° to give satisfactory results when the flow rates are appropriately adjusted. The smaller the inclination angle the greater the tumbling action of the objects; however, as the inclination angle is reduced the effective volume of the chamber is also reduced. The chamber may be cylindrical (without any slope to its side) or may be generally-cylindrical with a slope such that angle $a$ is less than 90° but greater than 45°. When the angle $a$ between the chamber sides and bottom decreases, the angle b of drum inclination from the horizontal may be less while maintaining an effective liquid volume in the chamber. Chamber rotation speeds of greater than 10 r.p.m. may increase the cementation rate but increased speeds require more expensive equipment. It has also been found that as low as about one r.p.m. will cause sufficient tumbling in the drum. If the flow rate is appropriately adjusted where operation is continuous, and if the retention time is appropriately adjusted in batch operation such low speed provides satisfactory reduction and cementation. Rotation may be continuous or intermittent. It may proceed in one direction or may be periodically reversed. When reversing is rapidly accomplished, the chamber is rocked back and forth about its axis to accomplish the desired relative motion between the solution and the scrap.

The iron-containing objects 16 are fed from bin 17 through upper outlet 11 of chamber 5 by conveyor 18. As the iron-containing objects 16 are used up during processing, additional objects should be added to maintain the desired flow rate/surface area ratio. The amount of iron-containing objects to be used should be initially computed to assure the presence of sufficient elemental iron to carry out the following chemical reaction which takes place in the chamber:

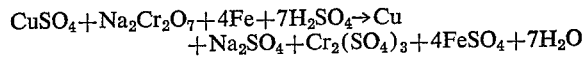

It has been found in practice that 1.5 to 3.0 times the theoretical amount of iron is consumed.

As copper is cemented from the solution in chamber 5, the precipitated particles flow into upper chamber portion 9 and overflow together with the rest of the discharging solution into collecting trough 21 where the particles and solution pass through conduit means 22 to settling tank 23. The cemented copper settles to the bottom of tank 23 and the remaining mixture is fed to an additional treatment area (not shown) where the mixture is further treated, before its discharge. The cemented copper may be removed through a drain in tank 23 and further processed for reuse.

Since less than 100% of the copper present in the waste solution leaving tank 1 is cemented during the above-described procedure, the present invention includes the further steps of recycling portions of the solution containing uncemented copper. Recycling can be accomplished by opening and closing valves to cause portions of the solution from tank 23 to be returned to tank 1 if further additions of acid are required or returned directly to line 4. The solution is then reprocessed to remove additional copper. Alternatively, the present invention contemplates causing the solution from tank 23 to flow to a second mixing and holding tank and rotatable chamber where additional cementation is accomplished.

We claim:
1. A method for the simultaneous reduction of hexavalent chromium and cementation of copper from a solution containing hexavalent chromium and soluble copper compounds comprising the following steps:
   (a) mixing sulfuric acid with the solution in sufficient quantities to maintain the pH of the mixture in the range of about 1.5 to about 3.0;
   (b) introducing a sufficient amount of such mixture into an inclined rotatable precipitation chamber having iron-containing objects therein so that the chamber overflows; and
   (c) rotating the chamber to tumble the objects therein to thereby simultaneously reduce hexavalent chromium to the trivalent state and cement copper which precipitates from solution.

2. A method of claim 1 in which the solution to be treated consists of pickle liquor, plating baths, acid rinse waters and combinations thereof.

3. The method of claim 1 having in addition the step of separating the processed solution from the cemented copper and further processing such solution to cement additional copper therefrom.

4. A method of claim 1 in which the relative motion between the objects and the mixture is caused by rapidly reversing the direction of rotation of the chamber.

5. The method of claim 1 in which the rotating motion of the chamber is intermittent.

6. A method of claim 1 in which the mixture is introduced into the precipitation chamber by a spray means.

7. The method of claim 1 in which the precipitation chamber is generally cylindrical in shape and is inclined with its axis of rotation at an angle of 45° or less from the horizontal and is rotated at more than 1 r.p.m.

References Cited
UNITED STATES PATENTS

| | | | |
|---|---|---|---|
| 3,490,899 | 1/1970 | Krivsky et al. | 75—109 |
| 2,292,207 | 8/1942 | Dearing | 75—109 |
| 3,540,880 | 11/1970 | Spedden et al. | 75—109 |
| 3,606,290 | 9/1971 | Ransom | 75—117 X |

FOREIGN PATENTS

| | | | |
|---|---|---|---|
| 235,902 | 6/1926 | Great Britain | 75—109 |

GEORGE T. OZAKI, Primary Examiner

U.S. Cl. X.R.
75—117, 121